F. A. TUTTLE.
CORN HARVESTING MACHINE.
APPLICATION FILED AUG. 14, 1908.
1,099,216.
Patented June 9, 1914
12 SHEETS—SHEET 7.
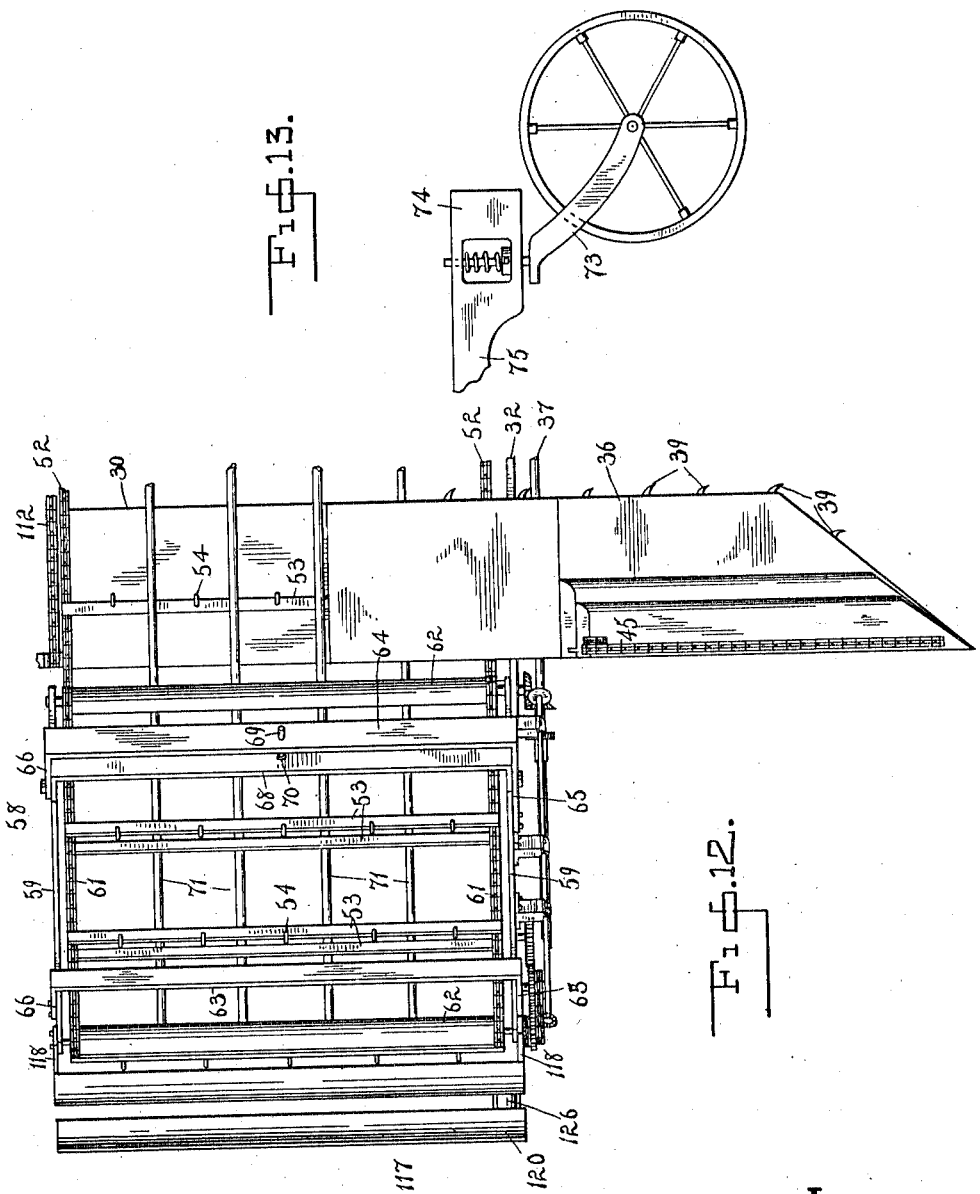
WITNESSES:
Mathew J. Marty
Chas. F. Bassett
INVENTOR
Frederick A. Tuttle
BY Frederick Benjamin
ATT'Y.

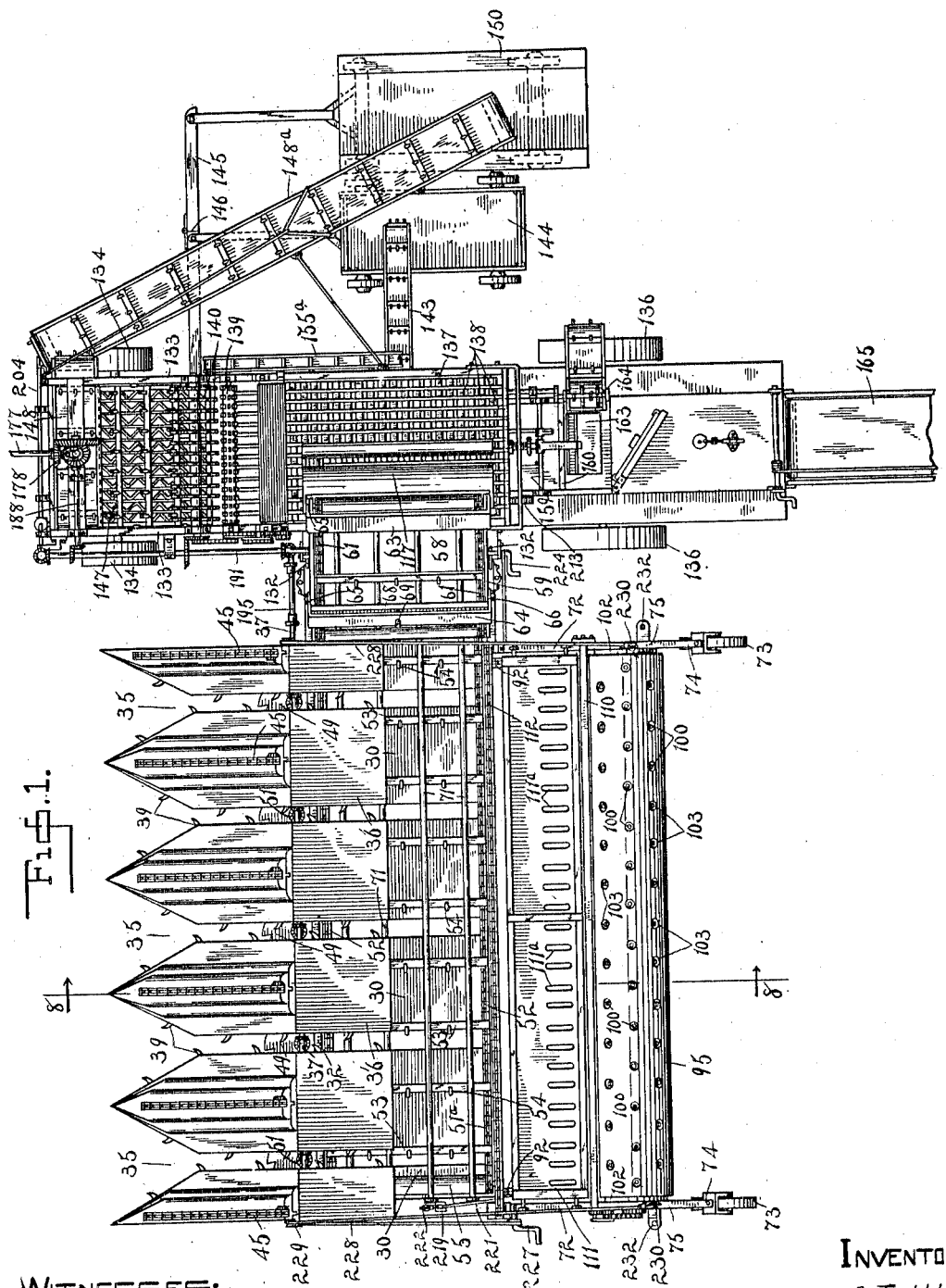

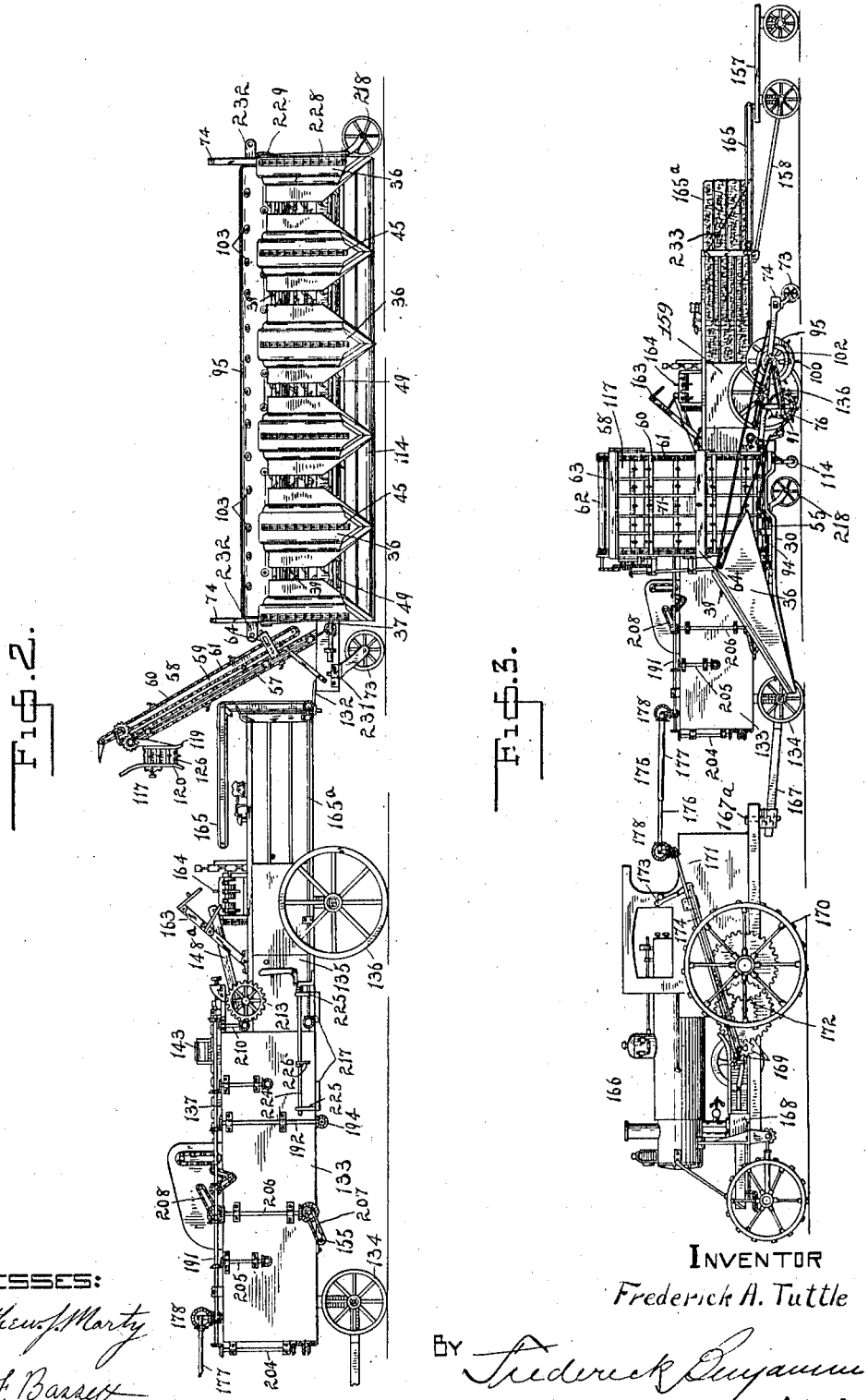

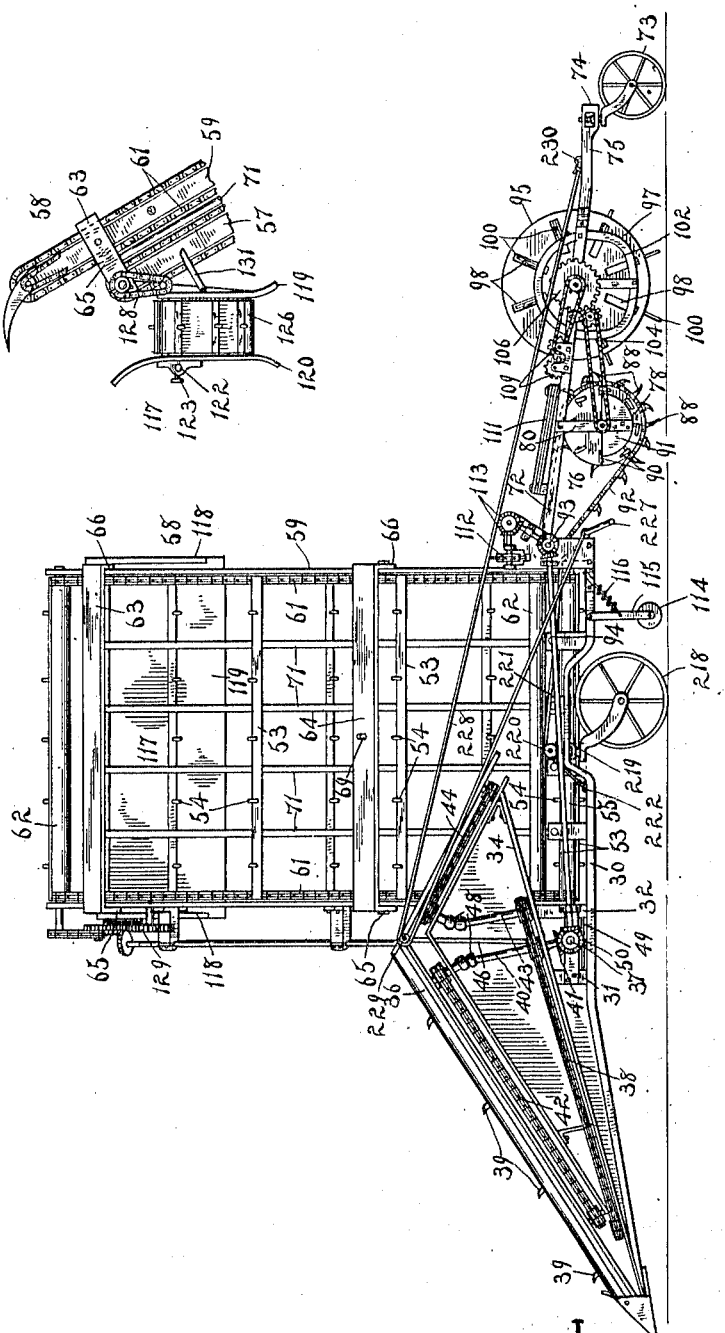

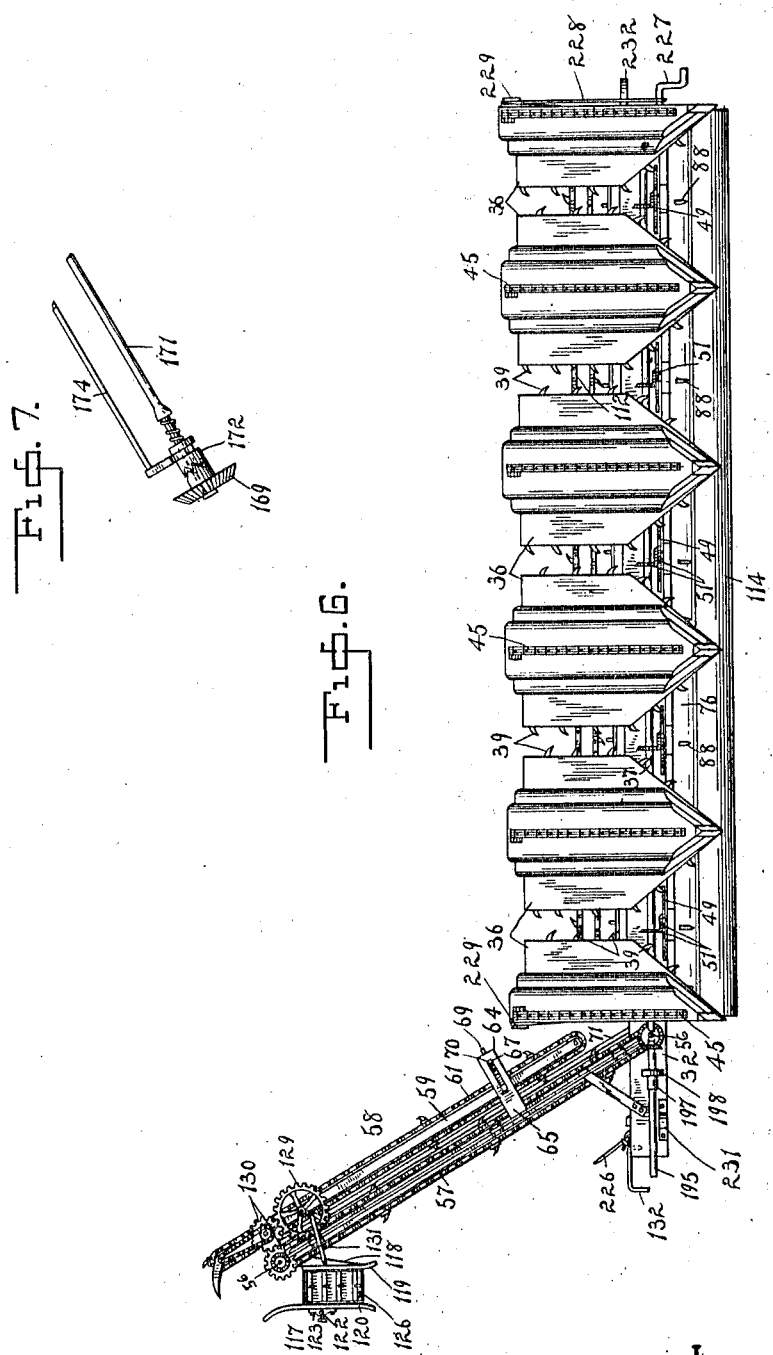

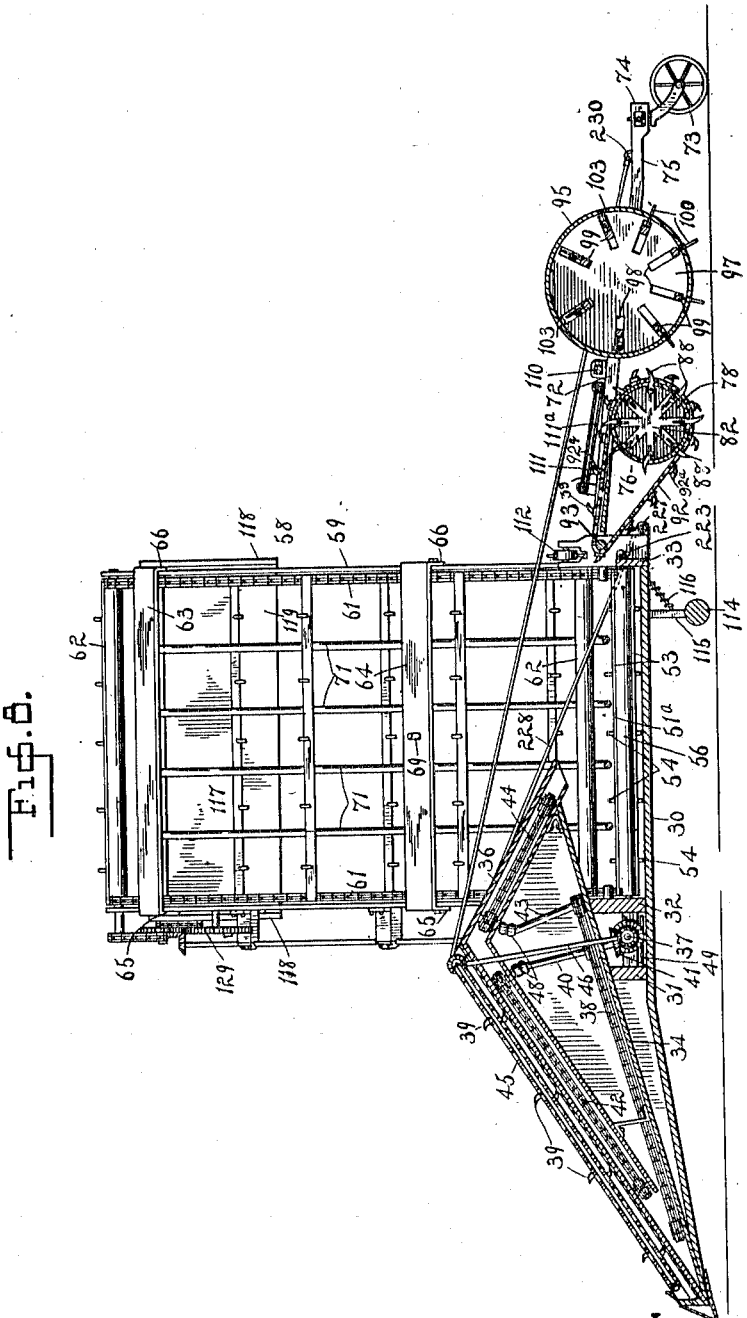

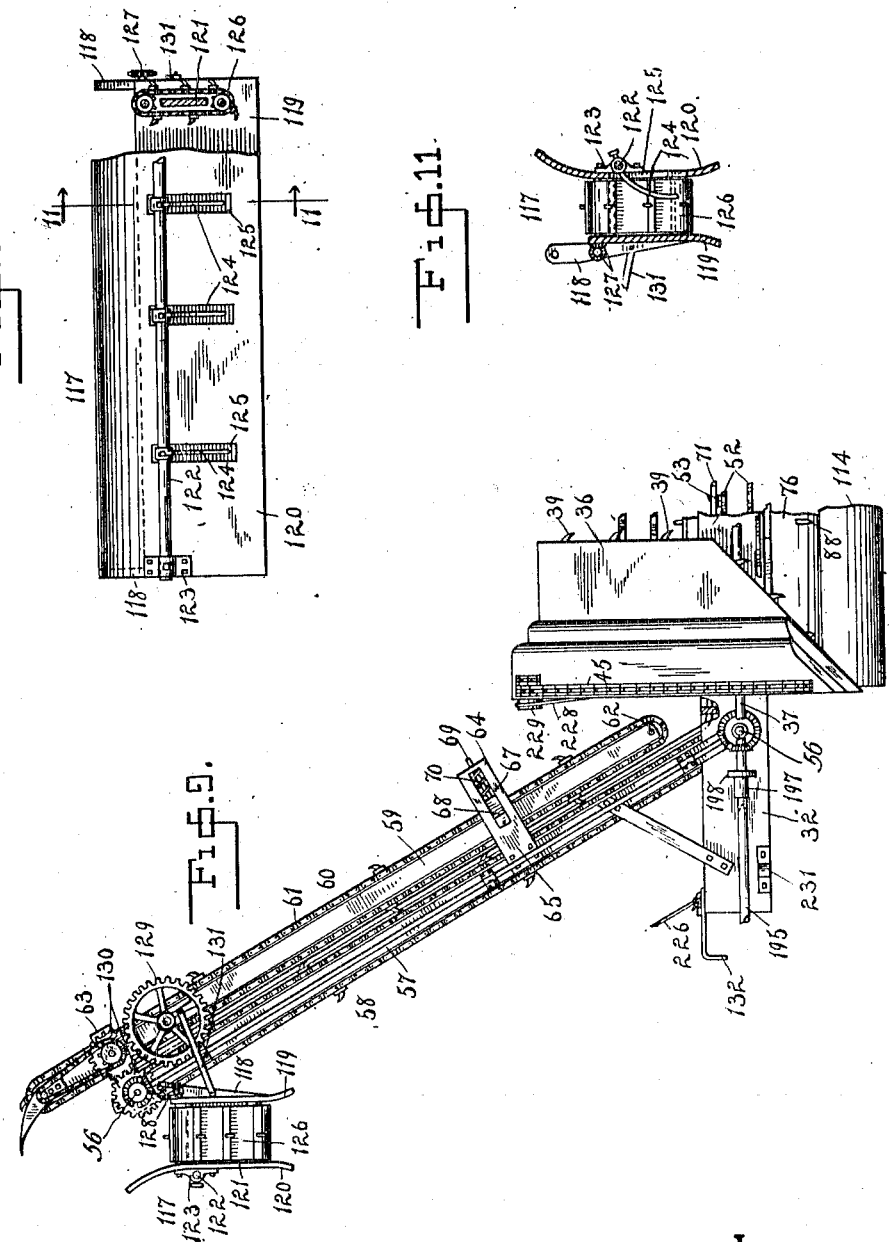

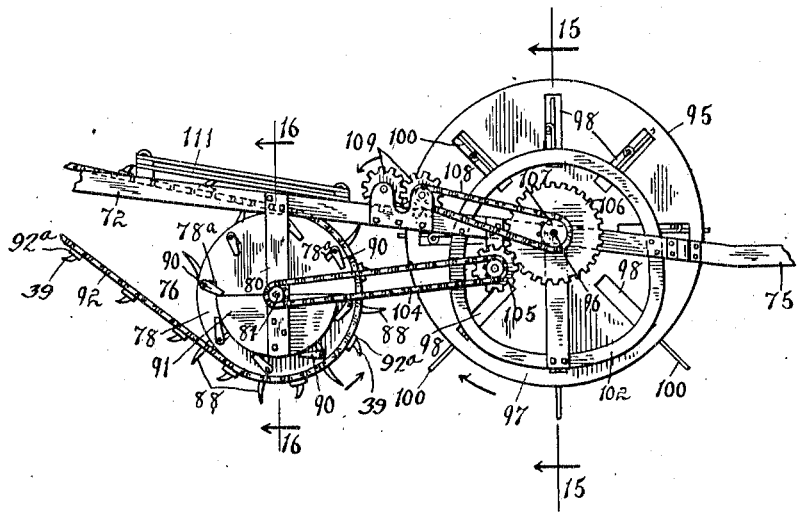
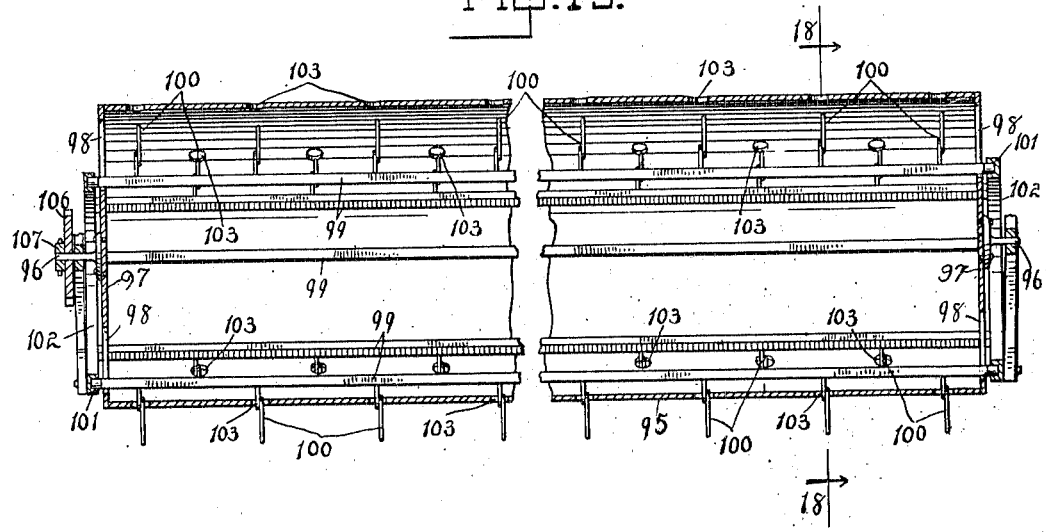

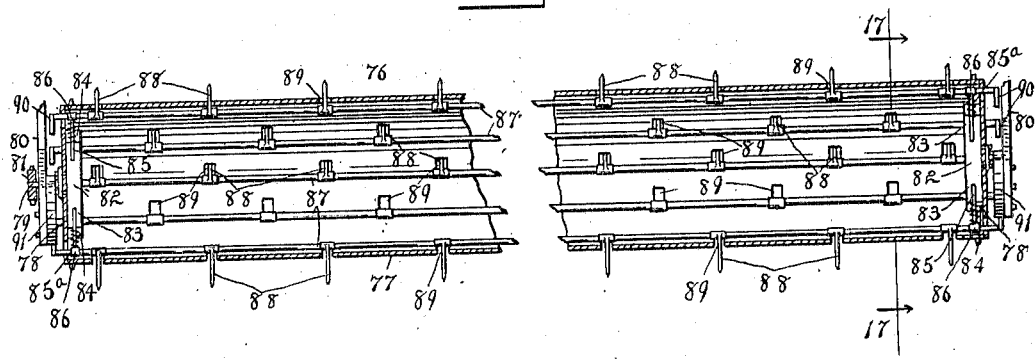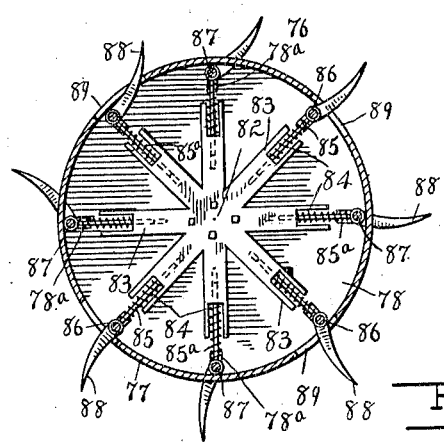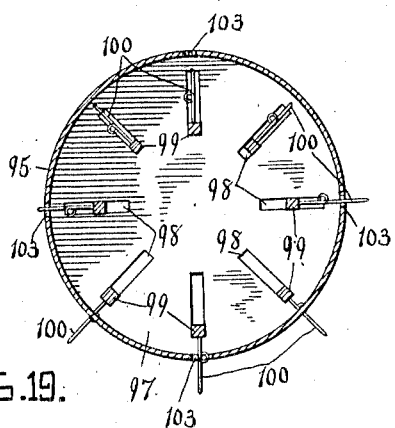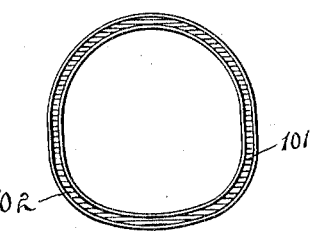

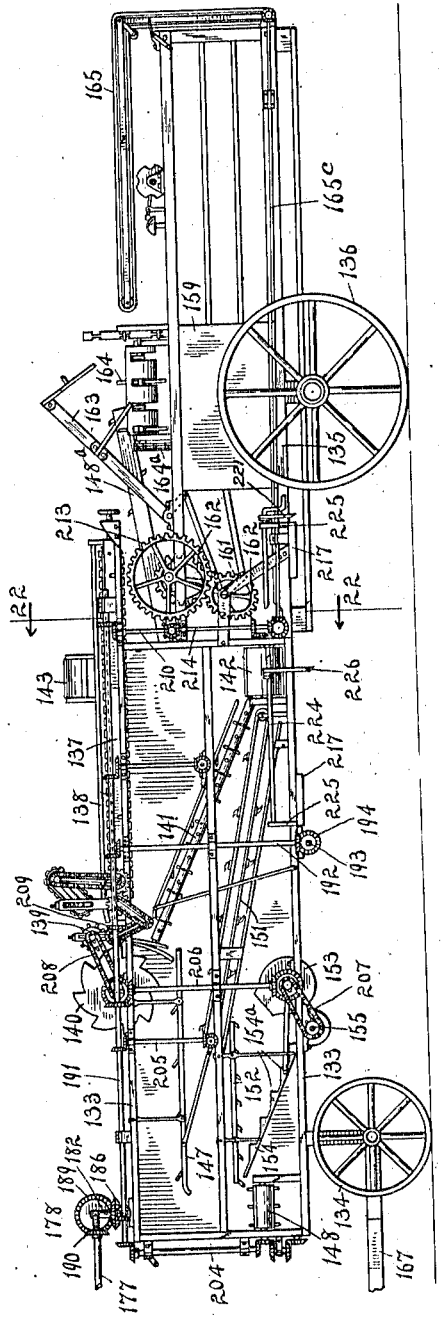

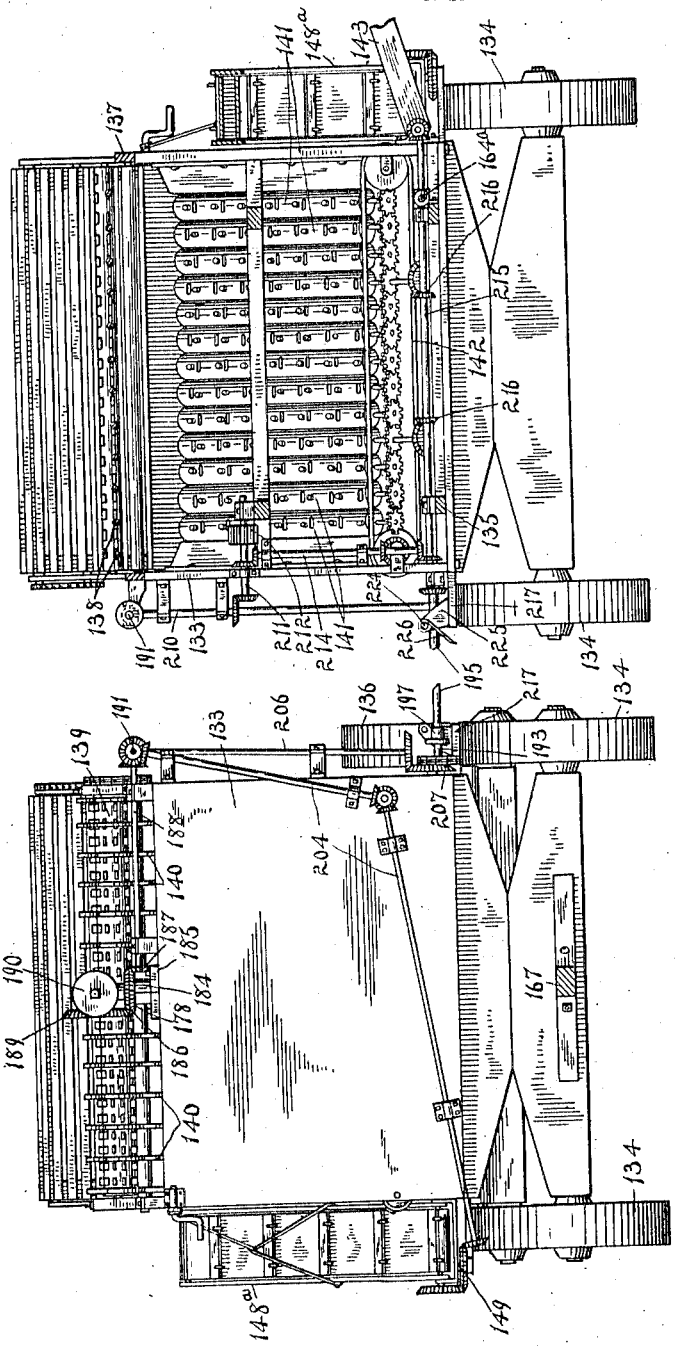

F. A. TUTTLE.
CORN HARVESTING MACHINE.
APPLICATION FILED AUG. 14, 1908.
1,099,216.
Patented June 9, 1914.
12 SHEETS—SHEET 12.
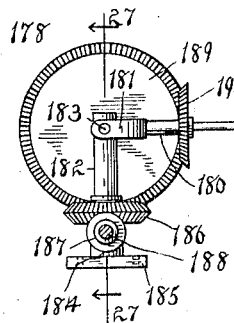
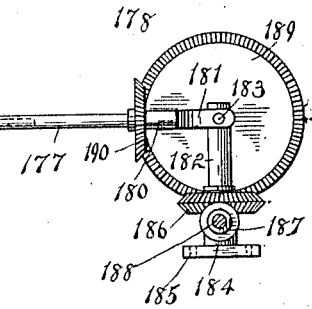
Fig. 23.
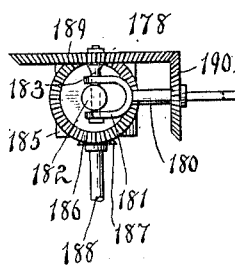
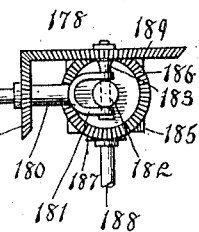
Fig. 24.
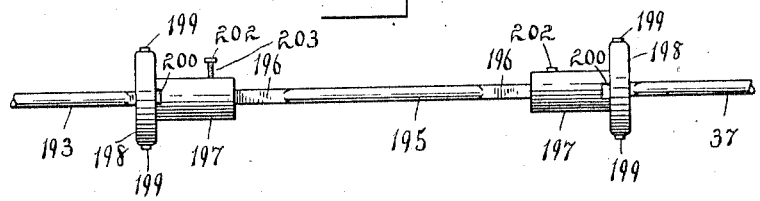
Fig. 25.
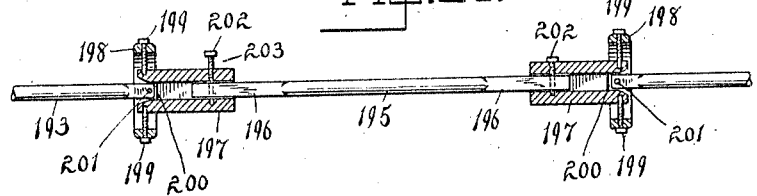
Fig. 26.
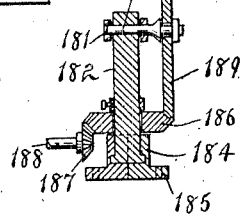
Fig. 27.
WITNESSES:
Mathew J Marty
Chas. F. Bassett
INVENTOR
Frederick A. Tuttle
BY Frederick Benjamin
ATTY.

UNITED STATES PATENT OFFICE.

FREDERICK A. TUTTLE, OF PLAINFIELD, ILLINOIS.

CORN-HARVESTING MACHINE.

1,099,216.  Specification of Letters Patent.  Patented June 9, 1914.

Application filed August 14, 1908. Serial No. 448,618.

*To all whom it may concern:*

Be it known that I, FREDERICK A. TUTTLE, citizen of the United States, residing at Plainfield, in the county of Will and State of Illinois, have invented certain new and useful Improvements in Corn-Harvesting Machines, of which the following is a specification.

My invention relates to agricultural machinery and refers especially to corn harvesters of that class in which the reduction of the stalks to a condition suitable for fodder is combined with the preliminary steps of gathering, snapping and husking.

The paramount objects of the improvements which form the subject matter of this application are:—to provide an appliance of the character stated combining in one apparatus suitable mechanism coöperating to accomplish dependently and in sequence the various steps required in the harvesting of corn, thus producing an implement that will complete the harvesting process during a single operation or journey of the appliance; to furnish from a single source adequate force for traction and also for the operation of the machine, and to supply an abundance of power for the mechanical movements from a source other than that derived from the traction wheels, thus avoiding the limitations and disadvantages of the latter method; to supply an apparatus that will have unusual capacity, by operating upon a number of corn rows at once, thus cutting a wide swath as the machine moves across the field, and resulting in a great economy both of time and labor, and as such an apparatus will necessarily have unusual dimensions, provision is made for reducing the lateral extension of the gathering frames and attached members, by suitable mechanical contrivances for folding and elevating various members, thus economizing space to such an extent that the entire apparatus will pass easily through ordinary gateways while being transported from one field to another.

Another important object of the invention is to furnish in a corn harvesting machine efficient appliances, comprising coacting elevating and conveying mechanisms, for gleaning the broken or down corn stalks and ears which may have escaped the main gathering devices.

I accomplish the above and other results of minor importance by the employment of the apparatus illustrated in the accompanying drawings forming a part of this application, the general features comprising a series of gathering frames, stalk severing devices, gleaning mechanism coöperating therewith, snapping rolls for separating the ear corn from the stalks, shredding and baling mechanism, a traction engine for hauling the appliance and supplying the needed power for the mechanical movements, including the necessary conveyers and elevators, and suitable supporting wheels some of which are of the caster type, and mounting these wheels in a special manner.

Such of the details of the apparatus as it will be necessary to describe to give a clear understanding of the functions and operation of the machine as a whole are fully illustrated in the following views.

Figure 1 is a top plan view of the entire apparatus with the exception of the traction engine, showing the manner of attaching wagons for the reception of the harvested crop, a portion of the baling apparatus being broken away; Fig. 2 is a side elevation of the entire apparatus except the traction engine, in position for transportation, the gathering, severing, and gleaning sections having been placed in their condensed or folded positions and temporarily attached to the rear of the baling section; Fig. 3 is a side elevation of the entire apparatus, including the traction section or unit; Fig. 4 is a side elevation, enlarged, of the stalk gathering section, including the gleaning devices and stalk elevator; Fig. 5 is a fragmentary view of the upper end of the stalk elevator showing connected therewith the end of the vibrating hopper and feeding apron; Fig. 6 is a front elevation of the gathering section and attached stalk elevator; Fig. 7 is a fragmentary view of the main clutch; Fig. 8 is a sectional view, enlarged, on the line 8—8 of Fig. 1, with the shredder section removed; Fig. 9 is an end elevation of the stalk elevating mechanism showing a portion of one of the gathering frames; Fig. 10 is a side elevation of the stalk distributing vibrating hopper, with a portion of one side broken away; Fig. 11 is a sectional view on the line 11—11 of Fig. 10; Fig. 12 is a top plan view of the stalk elevator, showing a portion of the gathering frame adjacent thereto; Fig. 13 is a side elevation of one of the caster wheels and bearing; Fig. 14 is a fragmentary view showing the gleaning appliances in end elevation; Fig. 15 is a longitudinal section on the line 15—15 of Fig. 14; Fig. 16 is a longitudinal section on the line 16—16 of Fig. 14; Fig. 17 is a sectional view on the line 17—17 of Fig. 16; Fig. 18 is a transverse section on the line 18—18 of Fig. 15; Fig. 19 is a side view of the cam for operating the rake bars of the large rake cylinder; Fig. 20 is a side elevation of the shredding and baling sections, with the side casing removed; Fig. 21 is a front elevation of the shredder; Fig. 22 is a sectional view on the line 22—22 of Fig. 20; Figs. 23 and 24 are, respectively, side and plan views of the telescoping driving shaft and flexible gearing connecting the motor with the harvester; Figs. 25 and 26 are a side elevation and longitudinal section, respectively, of the telescoping shaft, between the shredder and gatherer, and Fig. 27 is a sectional view on the line 27—27 of Fig. 23.

Referring to the details of the drawing, I will first describe that section of the apparatus devoted to the gathering and severing of the stalks and including the conveying of the gathered stalks to the succeeding section in which the harvesting process is carried one step farther. The section now to be considered will be hereinafter designated in its entirety as the gatherer, and comprises a main frame consisting of a series of horizontally disposed frame plates 30 securely connected and supported by parallel bridge members 31, 32, 33 arranged transversely to the said frame plates, subsidiary frame plates 34 being superposed above the main plates 30 and inclined so that the forward ends of the plates meet in front and are pointed in the manner shown. The plates thus joined are arranged with a suitable interval between them, forming throats 35, the plates being of proper width so that these throats correspond with the rows of corn as planted in the field. Upon each of these divisions is erected a gathering frame 36 for supporting the gathering devices, which consist for the most part of endless chains or bands arranged in groups upon opposite sides of the throats 35. The girders 31 are short beams extending the width of the plates 30, 34, while the girders 32, 33 extend entirely across the machine. Between the members 31 and 32 and parallel therewith is arranged a main drive shaft 37. Arranged upon opposite sides of each throat is an endless gathering chain 38, carrying spaced teeth 39 which project into the throat 35. This chain is operated through the medium of a sprocket mounted on an inclined shaft 40 actuated by a miter gear 41, which meshes with a similar gear on the drive shaft 37. The upper end of the shaft 40 carries a sprocket which drives an upper gathering chain 42, also having teeth 39 projecting into the throat 35. The rear end of the lower gathering chain 38 drives a rear inclined shaft 43, the upper end mounting a sprocket to drive a rear chain 44, which is inclined downward, and this also has teeth 39 projecting into the space or throat 35. A summit or median chain 45 is arranged in each middle line between the throats or stalk passages 35 and has vertically projecting teeth 39. This chain 45 is driven by a shaft 46 operatively connected by suitable gearing with the drive shaft 37. The inclined shafts 40 and 43 are jointed at 48 to permit them to change their directions to correspond with the desired inclinations of the chains driven thereby.

Beneath the main shaft in the channel formed by the frame members or girders 31, 32, and directly in the path of the stalks as they enter the passages 37, are located stalk severing members 49, in the form of circular serrated disks or saws, placed horizontally and having the serrations suitably sharpened. These disks are mounted on short studs or shafts 50 which are journaled in the frame plates 30 and derive their movement from the drive shaft 37 through gears 51.

All the gathering chains above described are geared so that their teeth 39, projecting into the passages or throats 35 will move toward the rear, and the function of the chains 38, 42 and 45 are to seize the standing stalks and prevent them from being borne down by the onward movement of the machine before they are severed by the saws 49, and after being cut they are caught by the teeth of the rear chain 44 and carried to a horizontal position upon a carrier or conveyer, designated as an entirety by 51ª, with the tops of the stalks pointing to the rear. The said carrier or conveyer comprises parallel chains 52, spaced apart a suitable distance and running transversely to the travel of the machine as a whole. They are connected by spaced bars 53, having projecting pins 54. These carrier chains 52 engage sprockets on the ends of shafts 55, 56. The shafts 55 lie in a horizontal plane and are journaled in the frame members or girders 32, 33, while the shafts 56 are journaled in an inclined frame 57, so that the chains 52 where they pass over this portion of the apparatus, are also inclined to form an elevator 58 by means of which the stalks which are caught by the pins 54 will be carried to a point above the operating deck of the next, or shredding section, hereinafter described. As the stalks are carried along upon the chains the tops will project more or less beyond the rear chain while the butt ends will naturally lie more evenly than the tips. As the elevator frame rises at a sharp inclination, it will be necessary to provide a fender to prevent the corn from becoming disengaged from the grip of the pins 54 at the beginning of the ascent, which would result in an accumulation at the foot of the incline and soon clog the moving parts. To overcome this an auxiliary frame 59 is superposed above the frame 57, and upon this is mounted an endless apron or conveyer designated as an entirety by 60 and constructed in the same manner as the horizontal conveyer 51ª, comprising the side chains 61, running over sprockets mounted on shafts 62, journaled in the frame 59, and connected by cross pieces or bars 53, furnished with pins 54. The frame 59 of the upper elevator 60 is supported upon the lower frame 57 by hangers or brackets 63, 64, consisting of rigid plates having their ends bent downwardly at right angles to form attaching flanges 65, 66. The front flanges 65 of these hangers are rigidly attached to the lower elevator frame 57, and the body portions extend entirely across the elevator, the flanges 66 lapping over the side of the upper frame. The upper shaft 62 has a bearing in the frame 59, which is pivoted on the flanges 65, 66, of the bracket 63. The flanges of the lower hanger are provided with slots 67 to receive the ends of a yoke 68 secured to the upper frame. To the middle of the said yoke is fixed a pin 69 projecting through the bracket or hanger 64, and embracing this pin is a coiled spring 70, which tends to keep the upper frame in proximity to the lower, but will yield sufficiently to relieve any tendency to clog when the stalks are fed too fast. In order to prevent the corn stalks from falling between the cross bars of the carrier and elevator, longitudinal bars or rods 71 are arranged immediately above the lower carrier, the pins 54 being long enough to reach above these rods and catch the stalks so as to carry them along.

In the harvesting of Indian corn a considerable percentage of the stalks will be missed by the gathering devices as they are usually constructed. This happens either because the stalks are broken off so as to lie prone upon the ground, or are bent so low as to escape the rakes, chains, or other devices employed. For the purpose of preventing the loss which would otherwise occur from this down condition of the crop, I provide gleaning appliances, which travel in the wake of the gathering frames and devices hereinbefore described. These appliances are mounted upon an auxiliary rectangular frame 72 extending entirely across the rear of the gatherer, the side members of the frame being pivotally connected to a countershaft hereinafter described, while in the rear it is supported by removable caster wheels 73, journaled at 74 in beams 75, which project rearwardly. Within this frame are mounted two cylinders of different diameters, and extending entirely across the path of the gathering frames. The forward cylinder, designated as an entirety by 76, will be hereinafter termed the small rake cylinder, and comprises a shell 77 having end plates or heads 78 furnished with radial slots 78ª and to these plates are concentrically mounted gudgeons 79, journaled in hangers 80, pendent from the side members of the said frame 72. One of these gudgeons carries a small sprocket wheel 81, upon the projecting end. To the inner surface of each cylinder head 78 is secured a wheel 82 having radiating arms or spokes 83, extending to within a short distance of the shell. The ends of the spokes are provided with longitudinal slots 84, and in the bottoms of the slots the spokes are bored axially to receive slidable rods 85 which extend beyond the ends of the spokes and terminate in eyes or collars 86, in which are journaled round bars 87, extending between the spoked wheels in the opposite ends of the cylinder. The said bars are normally held against the inner face of the cylindrical shell by coiled springs 85ª, embracing the projecting portions of the rods. Upon the longitudinal bars 87 are fixed at spaced intervals curved rake teeth 88 which project through slots 89 in the shell 77 and are formed with knife edges. The ends of these bars project through the radial slots 78ª in the cylinder ends and upon their extremities are fixed operating lugs or fingers 90. Upon the inner face of the hangers 80, at each end of the rake cylinder, are fixed semi-circular cam plates 91, with which the said fingers 90 engage during one half the revolution of the cylinder, and throughout this period the rake teeth are held rigidly in operative position, projecting radially from the lower portion of the cylinder, as shown in Figs. 14, 16 and 17. As soon as the fingers 90 leave the periphery of the cam 91, the weight of the teeth will cause the rods to turn in the eyes 86, and the teeth will take the position shown in the upper half of the circumference of the cylinder in the figures cited. The cylinder is revolved in its bearings by chains 92 from a counter shaft 93, driven from the main shaft 37 by a link shaft 94. The chains 92 are connected by transverse bars 92ª having teeth 39 which coöperate with the rake teeth 88, to seize and transfer the stalks, after the said teeth 88 have been retracted, to the conveyer 51ª. In the rear of the said small rake cylinder is located a larger rake cylinder, designated as an entirety by 95, and journaled in the frame 72 by gudgeons 96 fixed to the centers of the end plates or heads 97. These plates are provided with radial slots 98, through which project the ends of squared bars or rake members 99, furnished with spaced teeth 100, consisting of spring rods or heavy wires inserted into one side of the bar, each tooth being bent into one or more coils intermediate of the ends to increase the resiliency. The extremities of the bars 99 are received in the grooves 101 of stationary cam rings 102, attached to the frame members externally to the cylinder heads at each end. The grooves 101 are located eccentrically to the cylinder axis and so formed that the bars 99 are moved away from the axis when traveling the lower portion of their path, thus projecting the teeth through holes 103 in the cylinder shell, and approach the axis when traveling the upper portion of the path, thereby retracting the teeth entirely within the said shell. This large rake cylinder or drum is driven from the sprocket wheel 81 of the small cylinder, by a chin 104, which operates a pinion 105, meshing with a larger gear 106 carried on one of the cylinder gudgeons 96. Upon the extremity of the same bearing is a sprocket 107, connected by a chain 108 to gears 109, thus driving a stalk beater 110 mounted upon the frame 72 in proximity to the large cylinder, as shown in Figs. 1 and 8. Extended above the smaller cylinders is an apron 111, furnished with slots 111$^a$, to permit the free passage of the rake teeth and in front of this apron and parallel with the conveyer 51$^a$ is a stalk chain 112 forming an auxiliary conveyer driven by gearing 113 from the counter shaft 93. The office of this auxiliary chain conveyer is to support and carry toward the elevator the top ends of stalks of excessive length, which might otherwise interfere with the proper delivery upon the conveyer 51$^a$ of the stalks brought from the rake cylinders.

Beneath the rear portion of the frame plates 30 and extending the width of the frame is hung a land roller 114 pivotally suspended at each end by links 115 and yieldingly held in a vertical position by coiled springs 116. The function of this roller is to level to the ground everything left by the gathering frames, breaking down the bent stalks, to be subsequently picked up by the rake cylinders.

The stalks severed by the cutters 49 and thrown upon the conveyer 51$^a$ together with the gleanings from the rake cylinders are all carried up by the elevator 58 previously described, and upon reaching the upper end are dumped into an oscillating hopper 117, suspended to the frame 57 by hangers 118, pivoted to swing on the upper transverse shaft 56. This hopper is composed of side plates 119, 120, connected at the front end by a cross piece 121, thus leaving the rear end open to permit the passage of the stalks which are usually of greater length than the width of the carrier. Upon the outside of the rear plate 120 is a rod 122, adjustable in bearings 123, and having curved arms 124 also adjustable and extending through vertical slots 125 in the said plate 120. By adjusting the said arms upon the rod and the latter in its bearings, the capacity of the hopper may be varied as required. Provision is made for insuring a positive and uniform feed through the hopper by a vertically disposed conveyer belt 126 mounted in the front end of the hopper and driven by gears 127 and chain 128 from the shaft 56. Upon the side of the upper elevator frame 59, opposite to the said hopper is journaled a crank gear 129, driven from the upper shaft 62 by gearing 130, and connected to the hopper by a crank rod 131.

The frame members 32 and 33 project beneath the elevator frames as stated and are provided with hooks 132 adapted to removably engage suitable sockets in projections hereinafter described extending from the frame of the next section, which comprises the shredding and allied mechanisms, which will now be described, and hereinafter designated in its entirety as the shredder. This section comprises a truck frame 133 mounted on wheels 134 placed near the forward end, the rear portion 135 of the frame constituting the foundation or frame for a third section of the apparatus comprising baling mechanism, this end of the frame being supported upon ground wheels 136.

Since the shredding and baling mechanisms which I employ are, in the main, those made use of in prevalent machines of a similar character, and well understood by those skilled in the art, the devices and construction will be described in a general way only, thus avoiding unnecessary matter which would needlessly cumber the description; the novel or unusual features, however, wherever they occur, being treated more at length and in sufficient detail to render them clear.

Within the upper part of the shredder frame is arranged an automatic feeder comprising a conveyer 137, upon which the stalks are evenly delivered through the action of the oscillating hopper 117, stalk guiding rods 138 being superposed to distribute the stalks for proper presentation to snapping rollers 139, which remove the ears from the stalks, the latter being carried forward to the shredding cylinder 140, and the ears falling upon husking rollers 141, a short transverse ear conveyer 142 conducting the ears to a long ear conveyer or elevator 143 from which they fall into a corn wagon 144, attached to a draw-bar 145 extending laterally from the shredder frame. This draw bar is furnished with a joint 146 to permit the bar to be folded out of the way when not in use. Below the shredding cylinder is placed a series of separating pans 147, and arranged to receive the shredded fodder therefrom is a transverse conveyer 148, which deposits its load upon a movable conveyer 148ª pivoted to the shredder frame and extending to some point above a fodder wagon 150, hitched to the draw bar 145 outside of the corn wagon 144. The conveyer 148ª is operated from the inclined shaft 204 (Fig. 21) through the medium of a double bevel gear 149, the shaft of said gear forming the pivot upon which the conveyer may be swung to the position shown in Fig. 1. In case it is desired to dispense with this method of disposing of the fodder and substitute therefor the baling process, the said conveyer 148ª may be swung upon its hinge or pivot to a position alongside the shredder so that it will carry the fodder back to the baling press, the rear end of the said conveyer being seen in this position in Fig. 20.

Mounted beneath the husking rollers 141 is a husk conveyer rake 151, comprising an endless belt provided with rake-teeth, the husks being delivered therefrom upon a vibrating sieve 152, which separates the shelled corn from the husks, the latter being then deposited upon the said transverse conveyer 148, where they are mixed with the shredded stalks. As the shelled corn falls from the corn sieve 152, it is subjected to a blast of air from a fanning mill 153, until it reaches an inclined oscillating frame 154 supplied with steps or riffles 154ª. Below this riffle frame is a transverse conveyer 155 of spiral form, (not shown) which receives the shelled corn as it falls from the frame 154 and carries it to the side of the shredder to be received by an endless apron 155ª which empties into the ear elevator 143, and thus reaches the wagon with the ear corn.

When the fodder is to be baled, the conveyer 148ª is swung alongside the shredder, as hereinbefore described, and a suitable bale truck 157 is attached in the rear of the frame portion 135, as seen in Fig. 3, its tongue 158 having its end secured beneath the frame of the baling apparatus. The latter comprises the usual baling chamber 159 in which is arranged a plunger 160 operated by a crank shaft 161, driven by elliptical gears 162. An automatic feeder fork 163 coöperates therewith, and a fodder beater 164 is arranged between the fodder conveyer and the baling chamber, so that all the fodder may be subject to its action before being deposited within said chamber which is accomplished automatically in the usual manner. The purpose of the said beater is to prevent the fodder from clogging in the conveyer. No detailed description of its construction is given since such devices are in common use and their mechanism well understood by those skilled in the art. To the rear of the frame 135 is pivoted a bale conveyer 165 jointed so as to permit of its being folded to the position shown in Fig. 20 when not in use. The operative position is seen in Fig. 3, the conveyer being extended to a horizontal position with the end supported upon the bale truck 157, a completed bale of fodder 165ª being shown thereon.

To provide adequate power for operating the various mechanical movements and to furnish traction, I supply a motor in the form of a traction engine 166 which is attached to the front of the shredder by a draft bar or tongue 167 attached to the engine frame at 167ª. The motor 168 transmits power through a train of gears 169 to the traction wheels 170 and also to an inclined shaft 171. Upon this shaft is arranged a clutch 172 operated by a lever 173, connected to the clutch by a link rod 174. Connection is made with the machinery of the harvesting devices by means of a main flexible drive shaft 175, which extends between the traction engine and the shredder, the shaft and connecting gearing being shown in detail in Figs. 23, 24 and 27. Since there will be more or less relative variation in the level of the units or sections connected by this shaft, due to inequalities in the ground traveled over as well as irregularities in the side motion, provision is made for compensating these uneven movements by making the shaft in two sections 176, 177, adapted to telescope, and providing the opposite ends of the shaft with universal gearing couplings, designate as an entirety by 178. The shaft section 176 is squared throughout the greater part of its length and the section 177 is furnished with a correspondingly square bore in which the section 176 has a sliding fit. As the universal couplings 178 are duplicates of each other a description of one will suffice for both.

Each shaft section is journaled in a sleeve 180 carrying at one end a fork 181, pivoted upon a post 182 by a stud pin 183. The said post is swiveled in a base 184, formed in sections to facilitate assembling, this base having a securing flange 185 for attachment to the supporting frame. Upon the post immediately above the base is loosely mounted a double faced miter gear 186, meshing by its lower face with a pinion 187 on the end of a link shaft 188. The upper face of said miter gear meshes with a larger miter wheel 189 journaled upon one end of the said stud pin 183, and this wheel in turn engages a pinion 190 fixed on the main shaft section. The link shaft 188 upon the traction engine receives motion from the said inclined shaft 171, and the corresponding link shaft 188 upon the shredder drives a line shaft 191, arranged along one side of the shredder frame, from which the majority of the mechanical movements are obtained in the three operating sections of the apparatus, namely, the shredder, the gatherer and the baler. The various movable elements of the gatherer, previously described connectedly and in detail, all derive motion from the line shaft 37 which is driven by a vertical link shaft 192. As the attachment between the gatherer and shredder is on the principle of a hinge a flexible coupling is provided for the said shaft 37. The details of this coupling are fully set forth in Figs. 25 and 26. An extension shaft 193, in alinement with the shaft 37, is connected to the vertical link shaft 192 by gears 194, and between the said extension and the main shaft 37 is inserted a rod or bar 195 having squared ends 196 which fit in correspondingly shaped bores in sleeves 197, attached to the ends of the shafts 37 and 193 by gimbal joints constructed in the following manner: The end of each sleeve next to its respective shaft is surrounded by a gimbal ring 198, pivotally attached to the sleeve by screw bolts 199. The corresponding end of the sleeve is furnished with a slot 200, into which the end of the adjacent shaft extends, a pivot pin 201 connecting the shaft with the sleeve. Removable screw bolts 202 are inserted through each sleeve and the included bar 195. When it is desired to convert the device into a telescoping coupling one or both of the said bolts are raised to the position shown at 203 in Fig. 26, when the said rod or bar will be free to move longitudinally in its socket. The said line shaft 191 extends the entire length of the shredder and is provided at various points with suitable gears which engage link shafts for driving the separate mechanisms. At the extreme front of the shredder an inclined shaft 204 operates the fodder conveyers. The husk conveyer rake is connected to the line shaft through the link shaft 205 and still farther to the rear a vertical shaft 206 serves the fan 153, a chain 207 connecting with the fan shaft to drive the shaft of the spiral conveyer 155. The upper snapping roller is revolved by a chain 208 from the shredding cylinder shaft, the gearing 209 operating the lower roller. At its extreme rear end the shaft 191 drives a vertical transmitting shaft 210 which operates the baling mechanism, through a counter shaft 211 on which is mounted a pinion 212 meshing with a large gear wheel 213 connected with the elliptical gears previously described. The said counter shaft 211 by means of a link shaft 214 drives the conveyer 142 and in addition actuates a transverse shaft 215 from which the inclined husking rollers 141 take their motion through miter gears 216, the said transverse shaft also operating the long ear corn conveyer 143. The fodder beater 164 is reached by a link shaft 164$^a$ extending from the transverse shaft 215 and a chain 164$^b$. The bale carrier 165$^c$ is operated by a connecting shaft 165$^e$ also getting its motion from the transverse shaft 215.

The hooks 132 previously described as attached to the gatherer frame engage frame plates 217 projecting from the side of the shredder as shown in Figs. 1, 20, 21 and 22. These hooks are loosely fitted so as to allow some play and the main frame of the gatherer is thus hinged to, and partially supported by, the shredder frame, and the hooks 132 and their attachments constitute the traction means whereby the gatherer is drawn across the field. The opposite side of the gatherer frame is supported by a caster wheel 218, furnished with a journal stem 219, which projects above its bearing in the frame and is surmounted by a grooved pulley 220, over which passes a cable or rope 221 fastened by one end to the frame at 222 and carried over a suitable pulley 223, to change its direction, and attached to a crank shaft or windlass 224 mounted upon bearings 225 secured to the frame plates 217. A short rope or cable 226 is attached to the crank shaft between said bearings, and the lower end secured to the gatherer frame. In order to reduce the dimensions of the apparatus while being transported so as to adapt it to pass readily through ordinary farm gates, provision is made for folding the rake cylinders and frame upon the gatherer, and the latter is then detached from the shredder and hitched to the rear of the baler in the manner shown in Fig. 2. Extending entirely across the rear of the gatherer frame is a crank shaft or windlass 227 and to the ends of this windlass are attached ropes or cables 228 which run forward to pulleys 229 on the gathering frame and are then led back to the rear of the rake frame and attached at some point 230. By turning the said windlass the rake frame with its mechanisms can be raised upon its hinged connection with the counter shaft 93 and laid over against the gathering frames. By first disengaging the hooks 132 and turning the crank shaft or windlass 224 to wind up the cables 221 and 226, the gatherer frame will be raised to a suitable height to permit the introduction of the stems of additional caster wheels into sockets or bearings 231 upon the ends of the girders 32, 33. The casters 73 which support the rear of the rake frame and are made removable, as stated, are utilized for this purpose, and the gatherer frame thus mounted upon the three caster wheels and supporting the rake frame and appurtenances is attached to the rear of the baler and when in this position the train of sections can be readily transported upon ordinary roadways and pass easily through gates of standard width. It may sometimes be desirable to change the line of travel of one or both of the caster wheels, on account of some unevenness in the path, and for this purpose extra bearings are furnished for said wheels in projections 232 on the beams 75 as shown in Figs. 1, 2, and 6.

The functions of the various mechanisms have been mentioned in connection with the detailed description of their construction and a general statement of the operation of the apparatus as a whole will now be given: With the various units or sections connected tandem, the traction engine or motor being in the lead, followed by the shredder and baler, and lastly by the gatherer with the rake frame folded thereupon, the appliance is transported to the field of operation. The gatherer is then detached from the baler, and placed at right angles to the shredder, the caster wheels 73 removed from the sockets 231 and the frame of the gatherer linked to the shredder frame by the hooks 132. The rake frame is then lowered to its operative position and the said wheels 73 restored to their normal location in the beams 75. The lever 173 is then operated to throw the clutch 172 in gear, when the apparatus will be ready for the harvesting operation. If it is desired to omit the last step in the harvesting process, that of baling, the arm or draw bar 145 is extended to the position shown in Fig. 1 and the fodder wagon 150 attached to its outer end. The long fodder conveyer 148ª will thus be swung so that its free end is above the bed of the said wagon. The traction engine is then put in motion and the entire apparatus travels across the fields taking in five rows of corn at once. The pointed ends of the gathering frames are entered between the corn rows and the stalks are received in the intervals or throats 35 between the frames where they are seized by the gathering chains and held up to the cutters 49, the severed stalks falling upon the conveyer to be carried to the elevator and thereby delivered into the oscillating hopper 117 which vibrates sufficiently to spread the stalks evenly upon the conveyer 137, the stalk guiding rods 138 insuring their proper presentation to the snapping rollers 139 which remove the ears from the stalks, the latter being carried onward to the shredding cylinder, the shredded product falling to the separating pan 147, from which it is delivered to the carriers and at length deposited in the fodder wagon 150. The ears fall from the snapping devices upon the husking rollers 141, from thence to the conveyers 142 and 143, being deposited finally in the corn wagon 144. The husks from the husking devices 141, mixed with a variable amount of shelled corn, are deposited upon the husk conveyer rake 151, and then subjected to the action of the corn sieve 152, the husks being carried over the front end of the sieve to the conveyer, while the kernels of corn will fall through the sieve upon the oscillating platform, a strong current of air from the fan driving the chaff forward to be mingled with the fodder while the corn descends to the conveyer 155 from which it is deposited upon the apron 155ª, and is thence carried to the ear conveyer 143, passing with the ear corn into the wagon 144, as hereinbefore described.

When the baler is used to compress the fodder the long fodder conveyer is swung alongside the shredder frame so that its end is opposite the baling chamber 159, the fodder wagon removed and the draw bar folded upon its hinge 146 so as to be out of the way, the corn wagon still maintaining the position shown in Fig. 1. The bale conveyer is extended to the position shown in Fig. 3 with the bale truck 157 attached as shown. When thus extended the conveyer is supported by a brace rod 233. The fodder and husks from the long conveyer are thus carried to the immediate vicinity of the baling device and after passing through the fodder beater 164 are fed to the baling chamber and compressed into bales in the usual manner, and the bales thus produced then carried by the bale conveyer 165 to the truck 157.

Having thus described my invention, what I claim as new, is:—

1. In a corn harvester, the combination with a suitable main frame, ground wheels for the frame, stalk gathering and severing devices carried on said frame, a stalk conveyer, and means for attaching said frame to a traction engine, of an auxiliary frame hingedly connected to the main frame, means on said auxiliary frame for gleaning the down corn, and means for transmitting power from the said traction engine to the mechanism.

2. In a corn harvester, the combination with a suitable main frame, stalk gathering and severing mechanism carried on the frame, a stalk conveyer and elevator, and means for attaching said frame to a traction engine, of an auxiliary frame hingedly connected to the main frame, means on said auxiliary frame for gleaning the down corn, supporting wheels for the auxiliary frame, and means for transmitting power from the said traction engine to the mechanism on both of said frames.

3. In a corn harvester, the combination with a suitable main frame, stalk gathering and severing mechanism carried on the frame, a combined stalk conveyer and elevator, a wheel partially supporting said frame, and means for attaching said frame to a traction engine, of an auxiliary frame hingedly connected to the main frame, gleaning devices on said auxiliary frame, removable supporting wheels for the auxiliary frame, and means for transmitting power from the said traction engine to the various mechanisms.

4. In a corn harvester, the combination with a suitable frame, stalk gathering and severing mechanism carried on said frame, a combined stalk conveyer and elevator, a caster wheel partially supporting the frame, and means for attaching said frame to a traction engine, of gleaning devices hingedly connected to the said frame, caster wheels partially supporting said gleaning devices, and means for transmitting power from the traction engine to the moving parts.

5. In a corn harvester, the combination with a suitable frame, stalk gathering and severing means carried on said frame, a combined stalk conveyer and elevator, a caster wheel under one end of the frame, and means for attaching said frame to a motor, of gleaning devices attached to the frames, removable caster wheels partially supporting said gleaning devices, an auxiliary conveyer for the stalk tops, and means for transmitting power from the said motor to the movable devices.

6. In a corn harvester, the combination with a stalk gathering and severing mechanism, a conveyer, and a motor, of gleaning devices comprising a frame, hollow cylinders journaled in the frame, movable rake members mounted in the cylinders, caster wheels partially supporting said frame, and means for transmitting power from the motor for supplying the mechanical movements.

7. In a corn harvester, the combination with a frame, stalk gathering and severing mechanism mounted thereon, a conveyer carried by said frame, and caster wheels partially supporting the frame, of means for moving the said frame vertically, gleaning devices foldably attached to the frame, and means for varying the distance between the tread of said caster wheels.

8. In a corn harvester, the combination with stalk gathering and severing mechanism, a frame therefor, a combined conveyer and elevator for stalks carried by the frame, an oscillating hopper on the elevator, and a traction motor for said harvester, of means for removably attaching said frame to the traction motor, a caster wheel having its stem slidably mounted in said frame, means for elevating said frame, and means for removably attaching additional ground wheels to the frame.

9. In a motor harvester, the combination with stalk gathering and severing devices, a frame therefor, a conveyer on the frame, an oscillating hopper, and a traction motor for the harvester, of means for removably attaching said frame to the motor, a caster wheel slidably mounted in the frame, an elevator for the frame, gleaning mechanism foldably attached to said frame, removable wheels supporting the gleaning mechanism, and means for attaching additional supporting wheels to the frame.

10. In a motor harvester, the combination with stalk gathering and severing devices, a frame therefor, and means for attaching the frame to the motor, of a caster wheel slidably mounted in said frame, an elevator for the frame, revoluble stalk rakes, a frame therefor, removable caster wheels partially supporting the rake frame, and means for transmitting power from the said motor to the mechanisms.

11. In a motor harvester, the combination with stalk gathering and severing devices, a main frame therefor, and a flexible connection between the frame and said motor, of an elevator for the main frame, a rake frame hingedly connected to said main frame, revoluble rakes journaled in the rake frame, removable caster wheels partially supporting said rake frame, a stalk conveyer on the rake frame, and operative connection between the mechanical movements and the motor.

12. In a corn harvester, the combination of stalk gathering and severing devices, a main frame therefor, a caster wheel slidably mounted in the frame, means for elevating the frame, means for removably attaching additional ground wheels, a rake frame hingedly attached to the said main frame, removable caster wheels partially supporting the rake frame, and means for folding the rake frame upon the main frame.

13. In a corn harvester including a motor, the combination of stalk gathering and severing mechanism, a main frame therefor, means for elevating the frame, a rake frame hingedly attached to the main frame, a hollow apertured cylinder journaled on said rake frame, a plurality of movable teeth arranged in said cylinder and adapted to be projected through the apertures, and means for folding the rake frame upon the main frame.

14. In a corn harvester including a motor, the combination of stalk gathering and severing mechanism, a main frame therefor, an elevator for the frame, a rake frame hingedly attached to the main frame, rotatable rakes mounted upon the rake frame, a stalk conveyer on the rake frame, removable caster wheels partially supporting the rake frame, and means for folding the said rake frame upon the main frame.

15. In a corn harvester including a traction motor, the combination of stalk gathering and severing mechanism, a main frame therefor, a rake frame hingedly attached to the main frame, rotatable rakes carried by said rake frame, a stalk beater, a stalk conveyer, an apron above said stalk conveyer, removable caster wheels partially supporting the rake frame, and means for folding the rake frame upon the main frame.

16. In a corn harvester including a traction motor, the combination of stalk gathering and severing mechanism, a main frame therefor, a land roller yieldingly attached thereto, a rake frame hinged to the said main frame, a plurality of rotatable rakes mounted on the rake frame, a stalk beater, a stalk conveyer, a slotted apron above the stalk conveyer, removable caster wheels partially supporting the rake frame, and means for folding the rake frame upon said main frame.

17. In a corn harvester including a motor, the combination with gathering and severing mechanism and a main frame therefor, of a land roller yieldingly mounted on said frame, means for elevating the frame, a plurality of gleaning devices comprising hollow rotatable cylinders, series of bars arranged longitudinally in the cylinders and rotatable therewith, rake teeth mounted on said bars and projecting through apertures in the cylinders, and cams for projecting the teeth through said apertures.

18. In a corn harvester including a motor, the combination with gathering frames and devices, a stalk cutting mechanism, and a supporting frame therefor, of a main stalk conveyer, an auxiliary conveyer, a land roller yieldingly mounted, means for elevating said frame, and gleaning devices arranged in the path of said gathering frames, said gleaning devices consisting of rotatable apertured hollow cylinders, a plurality of rake teeth mounted upon movable longitudinal bars, and mechanism for alternately projecting and retracting the teeth through the apertures during the rotation of the cylinders.

19. A corn-harvesting machine, including gathering and severing devices, mechanism for conveying and elevating the severed corn, gleaning devices in the form of apertured rotating hollow cylinders, a plurality of movable rake teeth arranged in series within the cylinders, and mechanism for alternately projecting and retracting the teeth through said apertures when the cylinders are operated.

20. A corn harvesting machine including gathering and severing devices, mechanism for conveying and elevating the severed corn, an oscillating hopper, gleaning devices comprising two coöperating hollow cylinders rotatably mounted, a series of rockable shafts mounted in one of said cylinders, a plurality of knife-edged teeth fixed upon said shafts, and projecting through apertures in the cylinder shell, means for rocking said shafts when the cylinder rotates, a plurality of longitudinal bars slidably arranged in the other cylinder, a plurality of teeth on said bars, and means for projecting and retracting the teeth through apertures in the cylinder shell.

21. A corn-harvesting machine including a motor, stalk gathering and severing devices, mechanism for conveying and elevating the severed stalks, gleaning devices comprising two coöperating hollow cylinders rotatably mounted, a series of rockable shafts arranged in one of said cylinders and projecting through slots in the cylinder ends, a plurality of knife edged teeth fixed on said shaft and projecting through apertures in the cylinder shell, means for rocking said shafts when the cylinder is rotated, a series of longitudinal bars slidably arranged in the other cylinder, a plurality of teeth on said bars and means for projecting and retracting the teeth through apertures in the cylinder shell.

22. A corn-harvesting machine including a motor, stalk gathering and severing devices, mechanism for conveying and elevating the severed stalks, gleaning devices comprising two coöperating hollow cylinders rotatably mounted, a series of rockable shafts arranged longitudinally in one of said cylinders, and having their ends projecting through radial slots in the cylinder ends and slidable therein, resilient means for extending the shafts in said slots, fingers attached to the ends of the shafts, fixed cams adapted to engage said fingers, a plurality of teeth fixed on said shafts, a series of longitudinal bars slidably arranged in the other cylinder, a plurality of teeth on said bars, and means for sliding the bars radially.

23. A corn-harvesting machine including a motor, stalk gathering and severing devices, a stalk conveyer, an oscillating hopper, gleaning devices comprising two coöperating hollow rotatable cylinders, a series of longitudinal bars arranged in one of said cylinders and having their ends projecting through radial slots in the cylinder heads, cams engaging the ends of the bars, a plurality of spring teeth on the bars extending through apertures in the cylinder shell, a series of rockable and slidable shafts arranged in the other cylinder, and a series of teeth fixed on said shaft and projecting through apertures in the cylinder shell.

24. A corn-harvesting machine, including a motor, stalk gathering and severing devices, a conveyer for the severed corn, an oscillating hopper, a gleaning device comprising a hollow, rotatable cylinder having an apertured shell, a series of longitudinal rods within the shell arranged with their ends projecting through radial slots in the cylinder heads, a plurality of teeth fixed on said rods and cams for operating said rods.

25. A corn-harvesting machine, including a motor, stalk gathering and severing devices, a conveyer for the severed corn, gleaning devices comprising two hollow rotatable coöperating cylinders having apertured shells, series of longitudinal rods arranged within the shells and having their ends projecting through radial slots in the cylinder heads, a plurality of teeth fixed on said rods, and cams arranged to engage the ends of said rods.

26. A corn-harvesting machine, including a motor, stalk gathering and severing devices, a conveyer for the severed corn, a land roller, gleaning devices comprising coöperating hollow rotatable cylinders having apertured shells, longitudinal rods within the shells arranged to slide radially, a plurality of teeth fixed on said rods, cams arranged to operate the rods, a conveyer for the gleaned stalks, a stalk beater and means for folding the devices into a smaller compass.

27. In a corn-harvesting machine including a motor, the combination with stalk gathering and severing devices, a main frame therefor, and a conveyer for the severed corn, of a land roller, means for elevating said frame, an auxiliary frame hinged to the main frame, gleaning devices comprising coöperating hollow rotatable cylinders having apertures in their shells, series of rods in the shells projecting through radial slots in the cylinder heads, a plurality of teeth fixed on said rods, cams adapted to engage the ends of the rods, a conveyer for the gleaned stalks, a stalk beater, removable wheels partially supporting the auxiliary frame and means for folding said auxiliary frame upon the main frame.

28. In a corn-harvesting machine including a motor, the combination with stalk gathering and severing devices, a main frame therefor, and a conveyer for the severed corn, of a caster wheel slidably and rotatably journaled in the frame, sockets on the frame adapted to receive additional wheels, means for elevating said frame, an auxiliary frame hinged to the main frame, gleaning devices on the auxiliary frame, a stalk beater, a conveyer for the gleaned stalks, a slotted apron above the gleaning devices, removable supporting wheels, and means for folding the auxiliary frame upon the main frame.

29. In a corn-harvesting machine including a motor, the combination with stalk gathering and severing devices, a main frame therefor, and a conveyer for the severed corn, of a caster wheel slidably journaled in said frame, sockets on the frame adapted to receive additional caster wheels, means for elevating said frame, a land roller, an auxiliary frame hinged to the main frame, gleaning devices on the auxiliary frame, said gleaning devices comprising cylindrical shells rotatably mounted, a series of rake rods arranged within said shells and slidable radially, rake teeth fixed on the rods, cams for operating the rods, a conveyer for the gleaned stalks, removable supporting wheels for the auxiliary frame, and means for folding the said auxiliary frame upon the main frame.

30. In a corn-harvester including a motor, the combination with stalk gathering and severing devices, a main frame therefor, a conveyer and elevator for the gathered corn, and gleaning devices hingedly attached to the said main frame, of shredding mechanism, a frame therefor, said frame partially supporting the said main frame, and means supported on the shredder frame for elevating the frame of the gathering devices.

31. In a corn-harvester including a motor, the combination with a gathering frame, gathering and severing mechanism thereon, a stalk conveying and elevating device, an oscillating hopper, and gleaning devices, of shredding mechanism, a frame therefor, said frame forming a partial support for the said gathering frame, means on the shredder frame for elevating the gathering frame, and a detachable connection between the said gathering frame and the shredder frame.

32. In a corn-harvester, including a traction motor, the combination with a gathering frame, stalk gathering and severing mechanism thereon, a stalk conveying and elevating device and an oscillating hopper, of a shredder, a frame for the shredder adapted to be attached to said motor, said frame partially supporting the gathering frame, means on the shredder frame for elevating the gathering frame, a detachable connection between the said gathering frame and the shredder frame, flexible gearing connecting the motor with the shredder mechanism, and with the gathering devices.

33. In a corn-harvesting machine including a motor, the combination with a gatherer, a frame therefor, a stalk conveyer and elevator and an oscillating hopper on the elevator, of a shredder, a frame for the shredder partially supporting the gatherer, a foldable draw-bar projecting from the shredder frame for the attachment of a fodder wagon, a line shaft carried by the shredder frame, flexible gearing connecting the motor and said line shaft, a telescoping shaft between the shredder and the gatherer, and a detachable connection between the shredder and the gatherer.

34. In a corn-harvesting machine including a motor, the combination of corn gathering and severing devices mounted upon a suitable frame, a shredder frame interposed between the gathering devices and the motor, said shredder frame forming a partial support for the gathering frame, a detachable connection between the said frames, a foldable lateral projection from the shredder frame for the attachment of wagons, a fodder conveyer hinged to the shredder frame and arranged to be swung laterally and vertically, and flexible gearing connection between the motor and the shredder mechanism.

35. In a corn harvester, including a motor, the combination with a gather frame, of corn gathering and severing devices mounted on said frame, gleaning devices foldably attached to said frame, a shredder arranged between the gather frame and the motor and partially supporting the said frame, suitable gearing connecting the motor with the shredder mechanism, means on the shredder frame for elevating the gather frame, a baling apparatus mounted upon the shredder frame, and operative connection between said gearing and the baling mechanism.

36. In a corn harvester including a motor, the combination with a gatherer frame, stalk gathering and severing mechanism thereon, a stalk conveyer, and elevator, an oscillating hopper attached to the elevator, and gleaning apparatus hingedly attached to the gatherer frame, of a frame interposed between the gatherer frame and the motor and partially supporting the gatherer frame, shredding and baling mechanism carried on said interposed frame, flexible gearing between the motor and the shredder, and a flexible shaft between the shredder and the gatherer frame.

37. In a corn-harvester, including a motor, the combination of a truck frame, supporting wheels therefor, shredding and baling mechanism on said frame, a second frame removably attached to said truck frame and partially supported thereby, a caster wheel supporting one end of the second frame, means carried on the truck frame for elevating said second frame, gathering and severing mechanism on the second frame, a stalk elevator, an oscillating hopper attached to the hopper, an auxiliary frame hinged to the second frame, gleaning devices mounted on said auxiliary frame, and means on the second frame for folding the auxiliary frame thereupon.

In testimony whereof I affix my signature in the presence of two witnesses.

FREDERICK A. TUTTLE.

Witnesses:
WM. B. MOORE,
CHAS. F. BASSETT.